United States Patent [19]

Broussard

[11] Patent Number: 5,194,151

[45] Date of Patent: Mar. 16, 1993

[54] OIL SKIMMER

[76] Inventor: David G. Broussard, 675 Wooddale Blvd., Apt. #135, Baton Rouge, La. 70816

[21] Appl. No.: 775,532

[22] Filed: Oct. 15, 1991

[51] Int. Cl.⁵ .............................................. E02B 15/04
[52] U.S. Cl. ................................... 210/242.3; 210/923
[58] Field of Search .................... 210/242.3, 776, 923, 210/527, 532.1, 540

[56] References Cited

U.S. PATENT DOCUMENTS

| | | | |
|---|---|---|---|
| 1,107,371 | 8/1914 | Welch | 210/242.3 |
| 3,219,170 | 11/1965 | Thune | 210/242.3 |
| 3,693,801 | 9/1972 | Pogonowski | 210/923 |
| 3,701,430 | 10/1972 | Tuttle | 210/242.3 |
| 3,708,070 | 1/1973 | Bell | 210/242.3 |
| 3,754,653 | 8/1973 | Verdim | 210/197 |
| 3,756,414 | 9/1973 | Crisafulli | 210/242.3 |
| 3,812,968 | 5/1974 | Aramaki et al. | 210/923 |
| 3,951,810 | 4/1976 | Grisafulli | 210/242.3 |
| 3,966,615 | 6/1976 | Petchul et al. | 210/242.3 |
| 4,058,461 | 11/1977 | Gaw | 210/242.3 |
| 4,120,793 | 10/1978 | Strain | 210/923 |
| 4,209,400 | 6/1980 | Mayes | 210/242.3 |
| 4,264,444 | 4/1981 | Bronnec | 210/242.3 |
| 4,325,826 | 4/1982 | van Waveren et al. | 210/776 |
| 4,554,070 | 11/1985 | Jordan | 210/242.3 |

FOREIGN PATENT DOCUMENTS

| | | |
|---|---|---|
| 5411 | 11/1979 | European Pat. Off. . |
| 2433660 | 2/1975 | Fed. Rep. of Germany . |
| 3042044 | 5/1982 | Fed. Rep. of Germany . |
| 2431420 | 3/1980 | France . |

Primary Examiner—Stanley S. Silverman
Assistant Examiner—Christopher Upton
Attorney, Agent, or Firm—Reginald F. Roberts, Jr.

[57] ABSTRACT

An apparatus for removing oil or other floating pollutants from the surface of a body of water including a barge for entrapping and containing floating pollutants, the barge having a bow and a stern, the barge having a plurality of individually adjustable louver doors on the bow of the barge for selectively admitting floating pollutants into the barge, the louver doors being aligned generally parallel to the surface of the water.

1 Claim, 6 Drawing Sheets

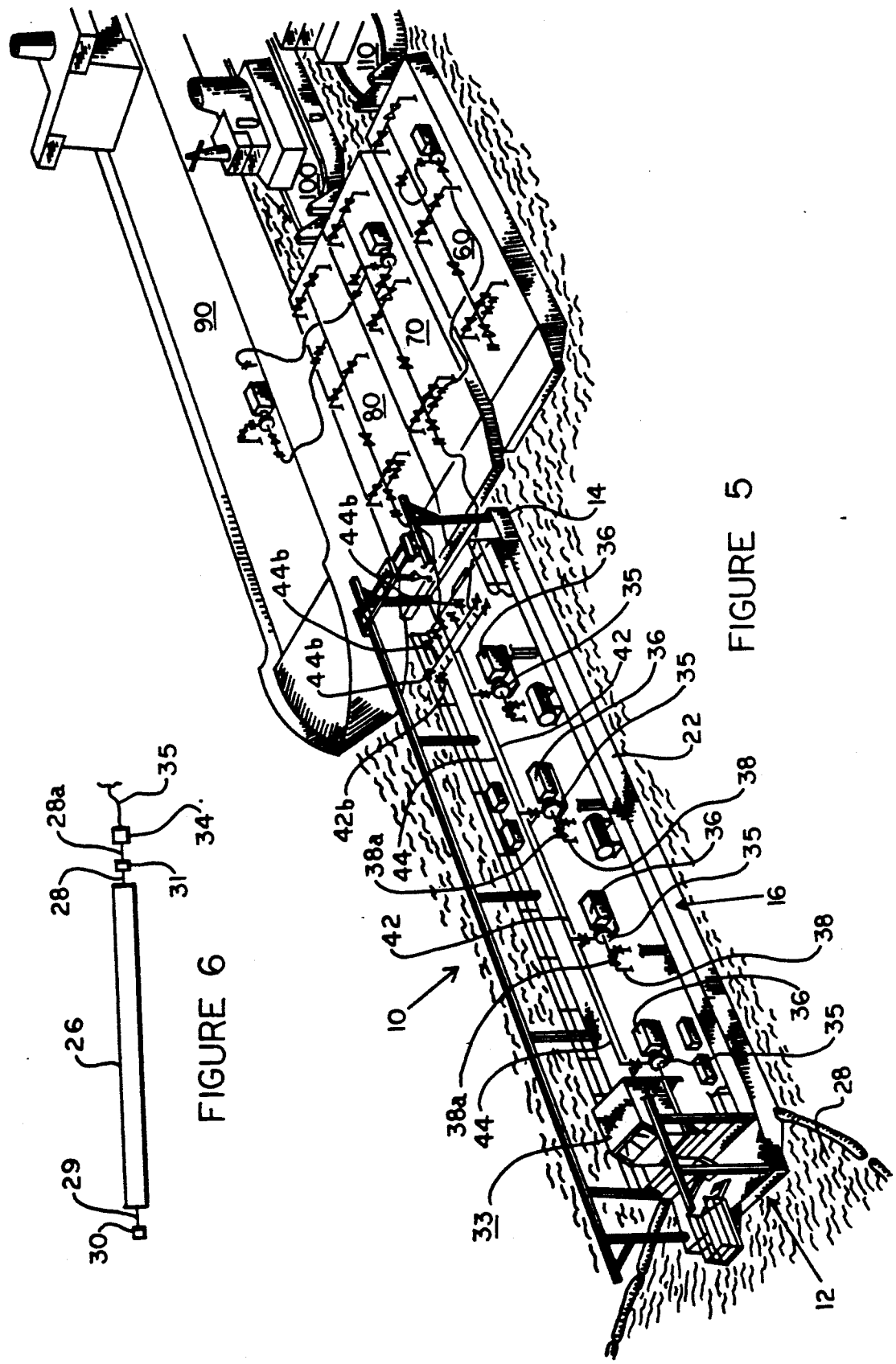

OIL SKIMMER

BACKGROUND OF THE INVENTION

1. Field of the Invention

The invention relates to removing oil or other pollutants floating on water, and, in particular, to floating devices for removing oil floating on water. More particularly, the present invention relates to oil collection barges.

2. Description of the Related Art

Oil collection devices and oil skimming devices are known in the art. Exemplary of such devices are those disclosed in the following U.S. Patents:

U.S. Pat. No. 4,264,444 discloses an apparatus for recovering material floating on a body of water and a barge for carrying such apparatus including a pair of elongated arms that are articulated on respective sides of a recovery opening mounted on a barge that carries a settling tank for collecting floating material. The draft of the barge is maintained essentially constant during loading of material ingested through the recovery opening and discharged into the tank whereby the depth of immersion of the recovery opening remains substantially constant. The articulation of the arms is such that they can move in a horizontal direction to sweep floating material into the recovery opening. Nozzles may be provided on the arms for creating currents that urge floating material swept by the arms into the recovery opening.

U.S. Pat. No. 3,966,615 discloses an oil collection barge which collects and then contains and concentrates oil spills on the surface of water. This action is affected by the flow of water and oil relative to a channel with an adjustable water and oil intake funnel at the forward end, an oil blockage wall at the rear, an adjustable flow splitter at the rear, a water vent at the rear bottom, and an adjustable vent plate at the rear bottom. These devices enable the operation of this action over large areas in a minimum of time and do so even given an adverse sea state.

U.S. Pat. No. 3,951,810 discloses an oil skimmer module with a free floating weir trough for removal of a layer of oil or other floating pollutants from the surface of a body of water incorporating a sump box having a pump disposed therein for conveying material from the sump box into a floating barge, vessel or other area. A free floating weir forming means is disposed forwardly of the sump box and connected and communicated therewith in such a manner that the weir forming means may vary in elevational relation to the sump box without the sump box being elevationally varied in relation to the surface of the water. The weir forming means is supported by float means which orients the weir of the weir forming means in desired relationship to the surface of the water.

U.S. Pat. No. 3,756,414 discloses an oil skimmer module for removal of a layer of oil or other floating pollutant from the surface of a body of water constructed in the form of a module employed with a desired number of similar modules for connection with a floating barge or other vessel for collecting and skimming off the oil when the barge or other vessel moves forwardly and discharging the collected oil or pollutant into storage tanks or the like incorporated into the barge or other vessel. Each oil skimmer module includes an open front receptacle having a horizontally disposed inclined front edge defining a weir that is capable of being raised or lowered for varying the depth of the weir in relation to the surface of the body of water. Each module also includes a pump for removing water and pollutants collected in the receptacle and discharging them into a suitable storage area such as settling tanks or the like on the barge or other vessel.

U.S. Pat. No. 3,754,653 discloses an apparatus and method for collection of oil from surface of the sea which is collected by means of a funnel-like scoop which is moved horizontally through the water in a direction such that oil and sea water, including waves, flow into the open end of the scoop. An oil-rich mixture flows over a weir located at the apex end of the scoop and the water is returned to the sea after separation of the oil. The trim of the scoop is adjusted by ballast tanks.

U.S. Pat. No. 3,708,070 discloses an oil skimmer which is used to recover surface oil from a body of water including a barge provided with a series of compartments, beginning at the prow of the barge, inflow to each compartment being effected over a respective floating baffle pivotally mounted at its bottom edge to swing into its compartment to a depth determined by the pressure differential across the baffle. Position of the baffle is controlled by pumping water at controlled rates from the bottom of the downstream end of each compartment to thereby cause an effective surface flow between compartments. Surface oil builds up in depth at the downstream end of the last compartment and is collected, substantially free of water, in a recovery chamber which is also provided with a floating baffle and from which oil is pumped at controllable rates.

U.S. Pat. No. 3,701,430 discloses a oil skimmer with a structure to be used in conjunction with a barge for skimming oil spilled on the surface of harbor waters, lakes and the like including one or two outriggers which can be partially positioned just below the surface of the oil and which have harvesting booms that converge at the rear joining a collector sump from which the oil and water can be pumped into the barge. The system may also include a means for separating the oil from the water and also for separating out large particles of debris which are frequently found floating in these waters. For use in situations where the body of water has a light-swell condition, the outriggers include flexible leading ends which will follow the contour of the water surface.

SUMMARY OF THE INVENTION

In accordance with the present invention there is provided an apparatus for removing oil or other floating pollutants from the surface of a body of water including a barge for entrapping and containing floating pollutants, the barge having a bow and a stern, the barge having a plurality of louver doors on the bow of the barge for selectively admitting floating pollutants into the barge, the louver doors being aligned generally parallel to the surface of the water.

BRIEF DESCRIPTION OF THE DRAWINGS

FIG. 5 is a perspective view of the barge of the invention located adjacent to storage barges and a ship; and FIG. 6 is a schematic plan view of a louver door of the invention.

BRIEF DESCRIPTION OF THE PREFERRED EMBODIMENTS

Figure 1A:
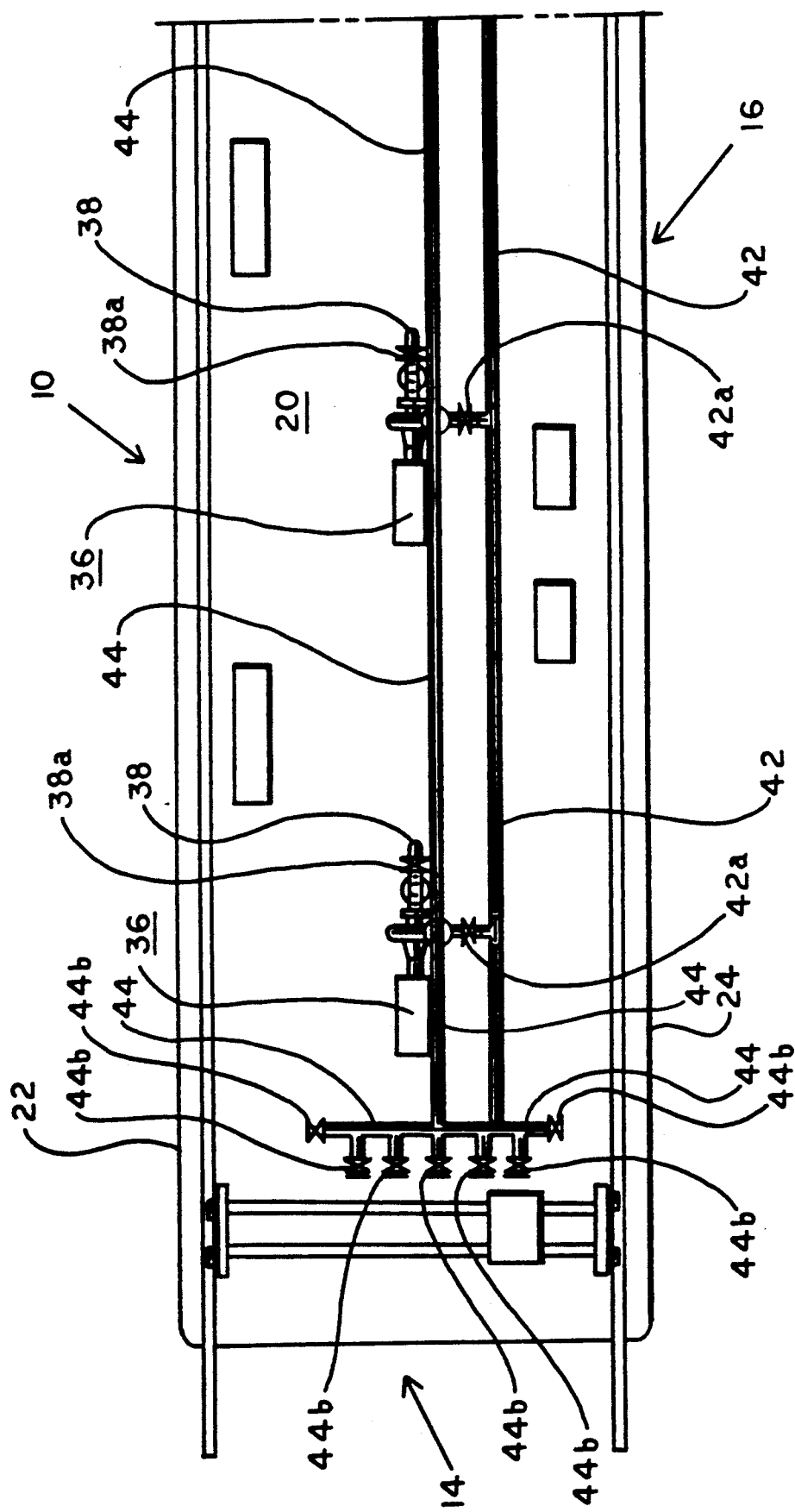
FIG. 1A is a top plan view of the stern half of the barge of the present invention.
Figure 1B:
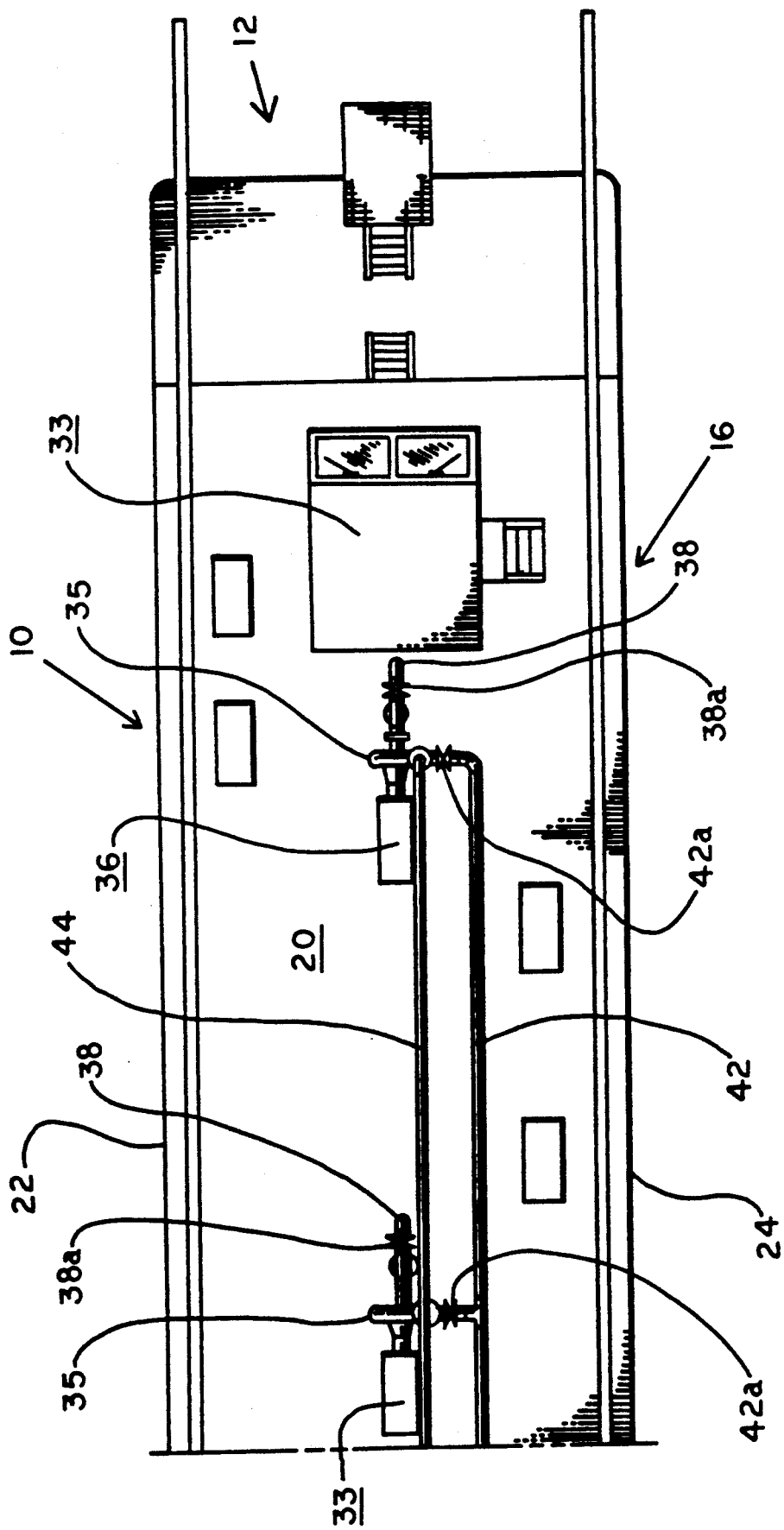
FIG. 1B is a top plan view of the bow half of the barge of the present invention.

Referring now to the drawings, in FIGS. 1a, 1b, 2a and 2b is shown the barge of the invention generally indicated by the numeral 10. Barge 10 has a bow generally indicated by the numeral 12 and a stern generally indicated by the numeral 14.

Barge 10 has a hull generally indicated by the numberal 16. Hull 16 has a bottom 18, a deck 20, a port side 22 and a starboard side 24, and a hold 11.

Figure 2A:
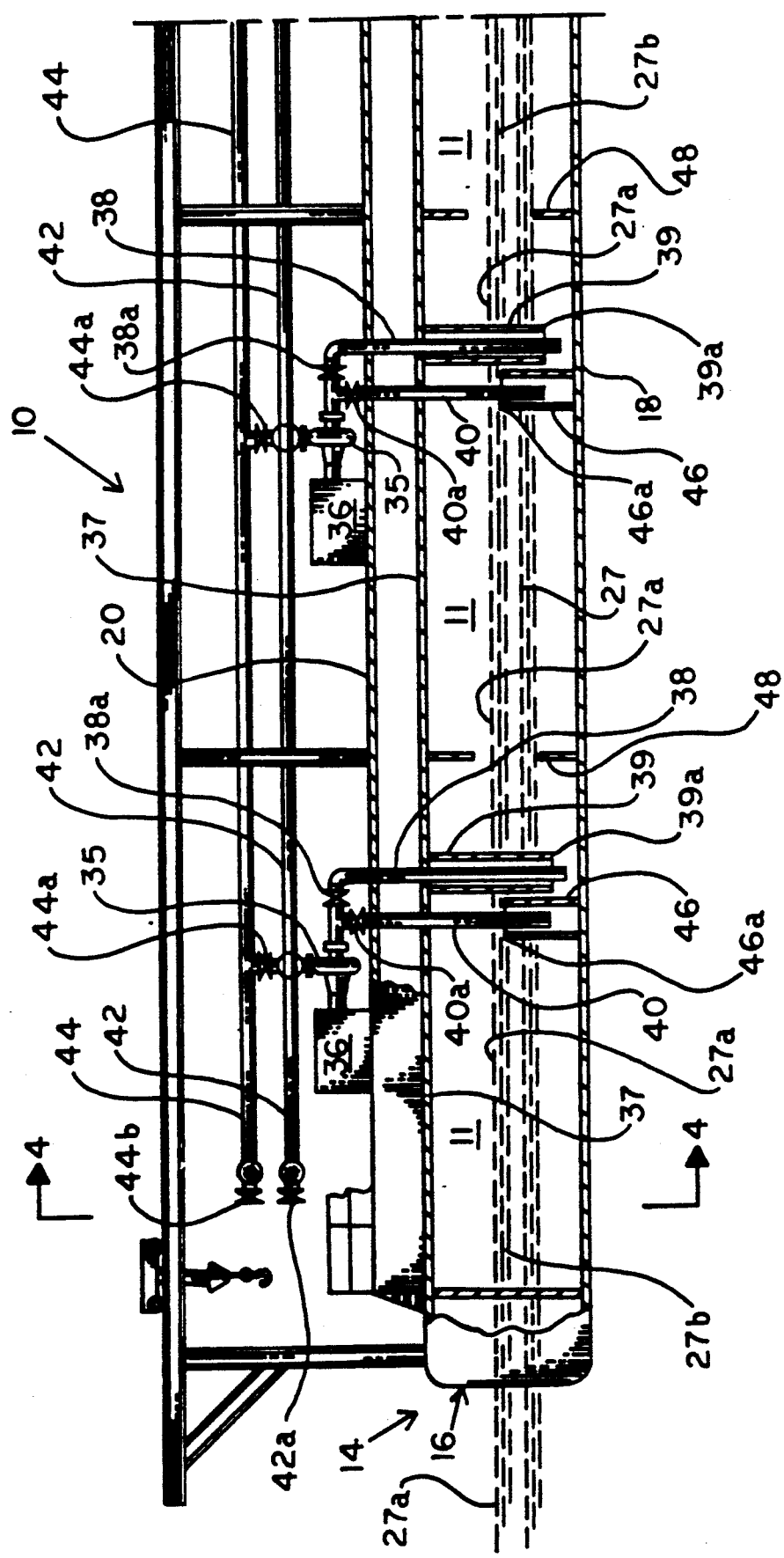
FIG. 2A is a partly cut-away, side elevational view of the stern half of the barge of the present invention.
Figure 2B:
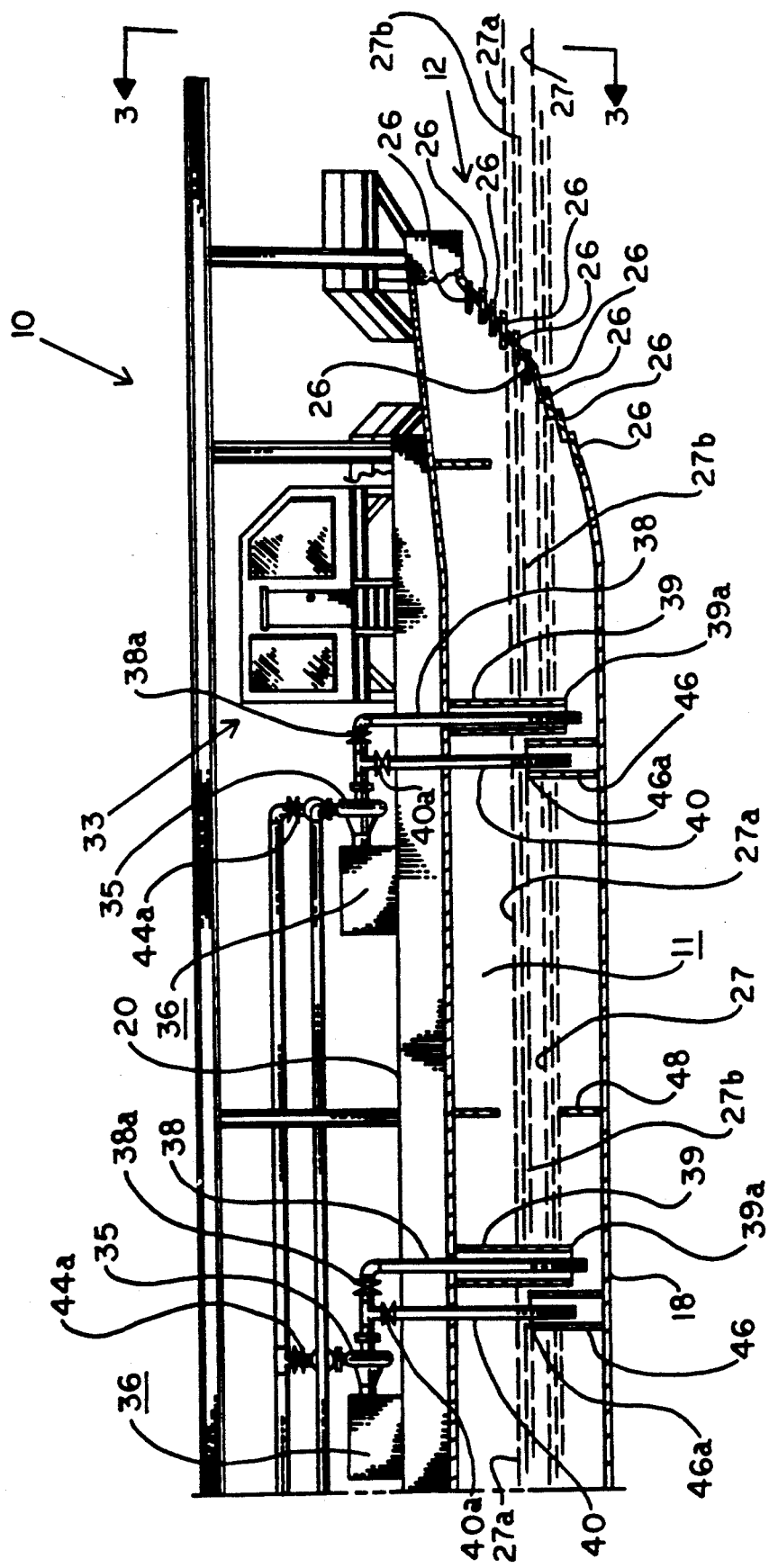
FIG. 2B is a partly cut-away, side elevational view of the bow half of the barge of the present invention.
Figure 3:
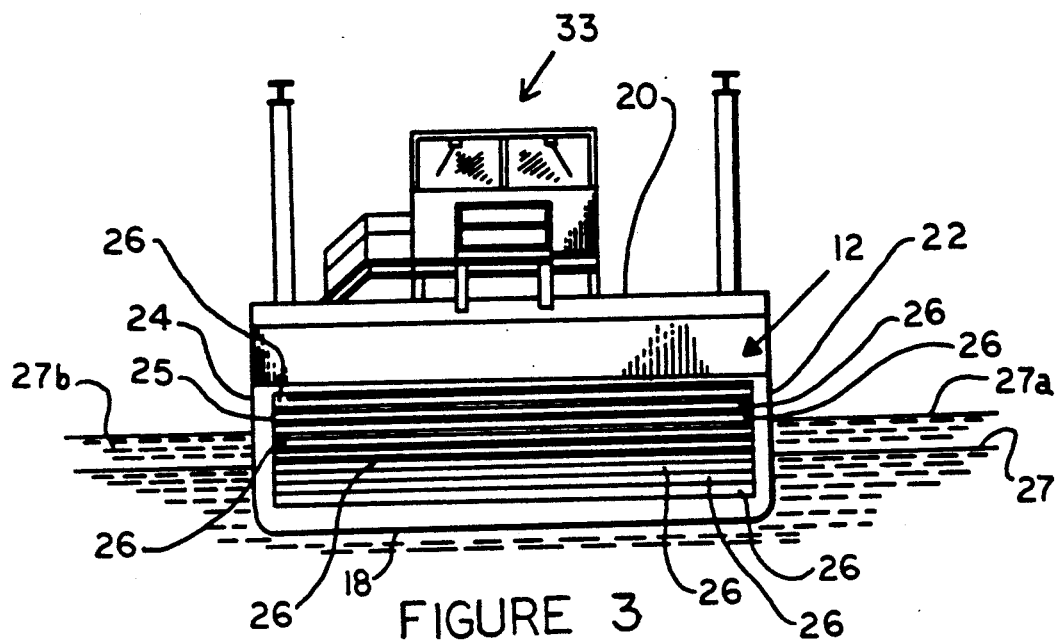
FIG. 3 is a cross sectional view taken along lines 3—3 of FIG. 2B.
Figure 4:
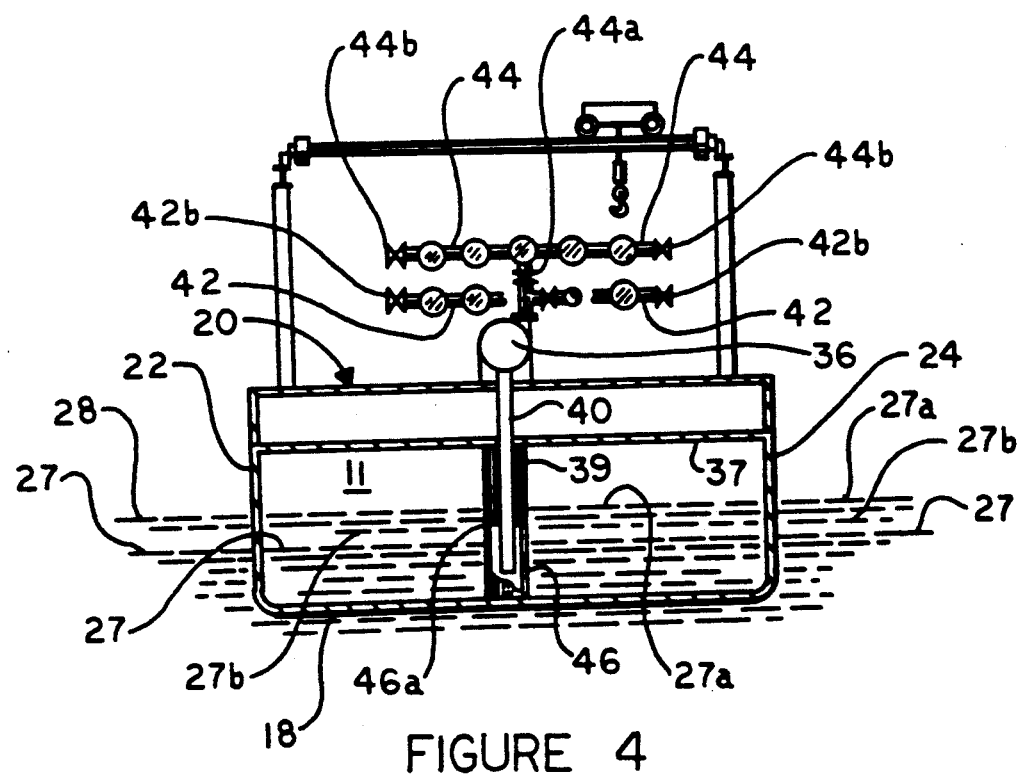
FIG. 4 is a cross sectional view taken along lines 4—4 of FIG. 2B.

Located in the bow 12 of hull 16 are a plurality of louver doors 26—26 as shown in FIG. 2B and 3 for admitting any pollutants 27a floating on the surface of the water 27 to the hold 11 of barge 10. Louver doors 26—26 fill opening 25 in the bow 12 of barge 10. A single louver door 26 is shown in greater detail in FIG. 6.

Louver door 26 is generally rectangular in length. Connected to each end of louver door 26 are axles 28 and 29 which are rotatably connected to bearing housings 30 and 31. Bearing housings 30 and 31 are rigidly connected to the interior of hull 16. Axle 28a is rigidly connected to axle 28 and to motor 34.

Motor 34 may be any motor known in the art for turning an axle. Control or power line 35 can supply hydraulic fluid under pressure to operator motor 34 if motor 34 is a hydraulic motor or electrical energy to motor 34 if motor 34 is a hydraulic motor. Control line 35 may be connected to a central control panel (not shown) that may be located in the operator cabin generally indicated by the numeral 33 as is known in the art to enable an operator to open or close each louver door 26 individually.

By providing individually controlled louver doors 26, the depth of the opening for admitting pollutants through bow 12 into the interior or hold 11 of barge 10 can be varied to coincide with the depth of the pollutants such as oil floating of the surface of a body of water. For example, in FIG. 2B, the surface 27a of floating pollutants extends above the surface 27 of the water upon which the pollutants 27b are floating. Louver doors 26 can be opened as shown in FIG. 2b to a level equal to the depth of the pollutants 27b floating on the surface 27 of the body of water in which barge 10 is floating.

Preferably motor 34 is a hydraulic motor to individually rotate each louver to a horizontal or open position shown in FIG. 2B for the upper louvers 26—26 and to a closed position as shown for the lower louvers 26—26 in FIG. 2B. When the barge 10 is being moved from one location to another, all louver doors 26—26 may be closed.

Located on the deck 20 of barge 10 are pumps 35—35 which are driven by pump motors 36—36. Pumps 35—35 may be any type of pumps known in the art, although centrifugal pumps are preferred. Pump motors 36—36 may be any type of motors known in the are, although internal combustion diesel engines are preferred.

Water in the hold 11 of barge 10 is removed by pumps 35—35 through pipes 38—38 and 42—42 after opening valves 38a—38a and 42a—42a, and closing valves 40a—40a. Pipes 38—38 are contained partially within concentric pipes 39—39 which are rigidly connected to the ceiling 37 of hold 11 and have bottom ends 39a—39a which lie beneath the surface 27 of the water in the hold 11 and the bottom 18 of the hull 16. Concentric pipes 39—39 prevent pollutants 27b floating on the surface 27 of the water in the hold 11 from entering pipes 38—38.

Pollutants 27b in the hold 11 of barge 10 are removed by pumps 35—35 through pipes 40—40 and 44—44 after closing valves 38a—38a and 42a—42a, and opening valves 40a—40a. Pipes 40—40 are contained partially within concentric pipes 46—46 which are rigidly connected to the bottom 18 of hold 11 and have bottom ends 46a—46a which above the surface 27 of the water in the hold 11 and beneath the surface 27a of the pollutants 27b in the hold 11 of hull 16. Concentric pipes 46—46 allow pollutants 27b floating on the surface 27 of the water in the hold 11 to enter pipes 40—40 and exclude water therefrom.

Preferably a series of baffles 48—48 are located on the bottom 18 of hull 16 to retard splashing and mixing of the pollutants and water in the hold 11. Preferably, a series of baffles 50—50 are located on the ceiling 37 of hull 16 to retard splashing and mixing of the pollutants and water in the hold 11.

Pollutants 27 removed from the hold 11 of barge 10 may be conveyed to adjacent barges generally indicated by the numerals 60, 70, and 80, and thereon to the ship generally indicated by the numeral 90 if desired. Tug boats or push boats generally indicated by the numeral 100 and 110 may be provided to push or move the barges. If desired, a boom 120 may be positioned adjacent to the bow 12 of barge 10 to direct pollutants to the opening 25 in barge 10.

Although the preferred embodiments of the invention have been described in detail above, it should be understood that the invention is in no sense limited thereby, and its scope is to be determined by that of the following claims:

What is claimed is:

1. An apparatus for removing oil or other floating pollutants from the surface of a body of water, the apparatus comprising:

a. a barge having a bow, a stern, and an interior cavity for containing the oil or other floating pollutants and residual entrained water, the bow having an opening therein for admitting the oil or other floating pollutants and residual entrained water into the interior cavity of the barge; and b. a plurality of individually-controlled overlapping substantially-rectangular members for controlling the depth below the surface of the water for admitting the oil or other floating pollutants and residual entrained water into the bow; the rectangular members having upper and lower sides, being vertically stacked, and being constructed and arranged so that each individual member can be independently opened and closed by rotation about a horizontal axis, the member when open admitting and when closed excluding the oil or other floating pollutants and residual entrained water into and from the opening in the bow, the member when fully open defining a substantially horizontal plane and being vertically displaced from a vertically-adjacent member, and when completely closed defining an oblique plane, with the upper side of a lower member contiguously overlapping the lower side of an upper member.

* * * * *